(No Model.) 4 Sheets—Sheet 2.
J. G. ALLEN, Dec'd.
S. A. W. Gould, administratrix.
ELECTRIC ARC LAMP.
No. 327,375. Patented Sept. 29, 1885.
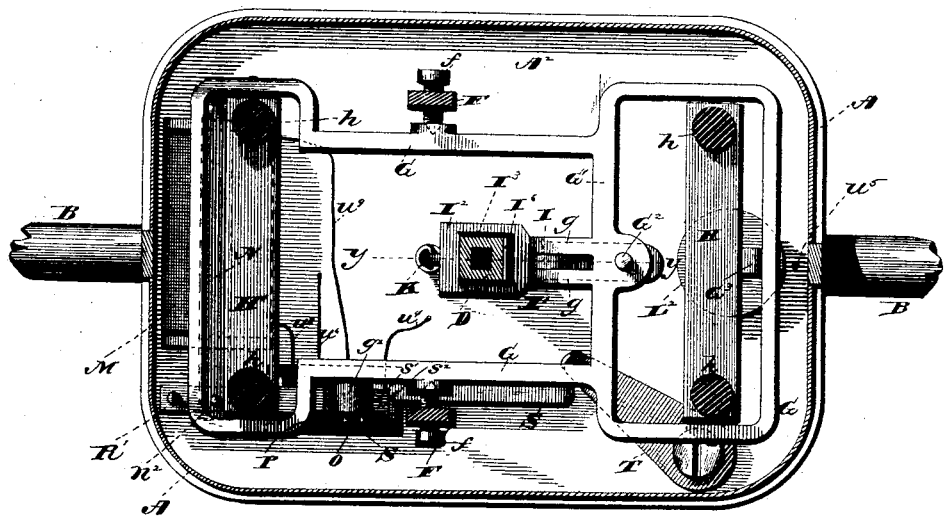
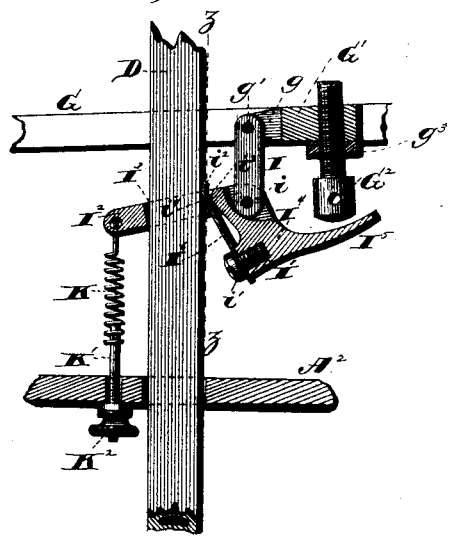
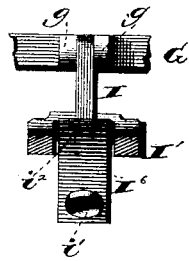
Witnesses:
Chas. J. Williamson
Henry C. Hazard
Inventor
John G. Allen, dec'd
by S. A. Wood Gould, Admtx
by Prindle and Russell
Attorneys (No Model.) 4 Sheets—Sheet 3.

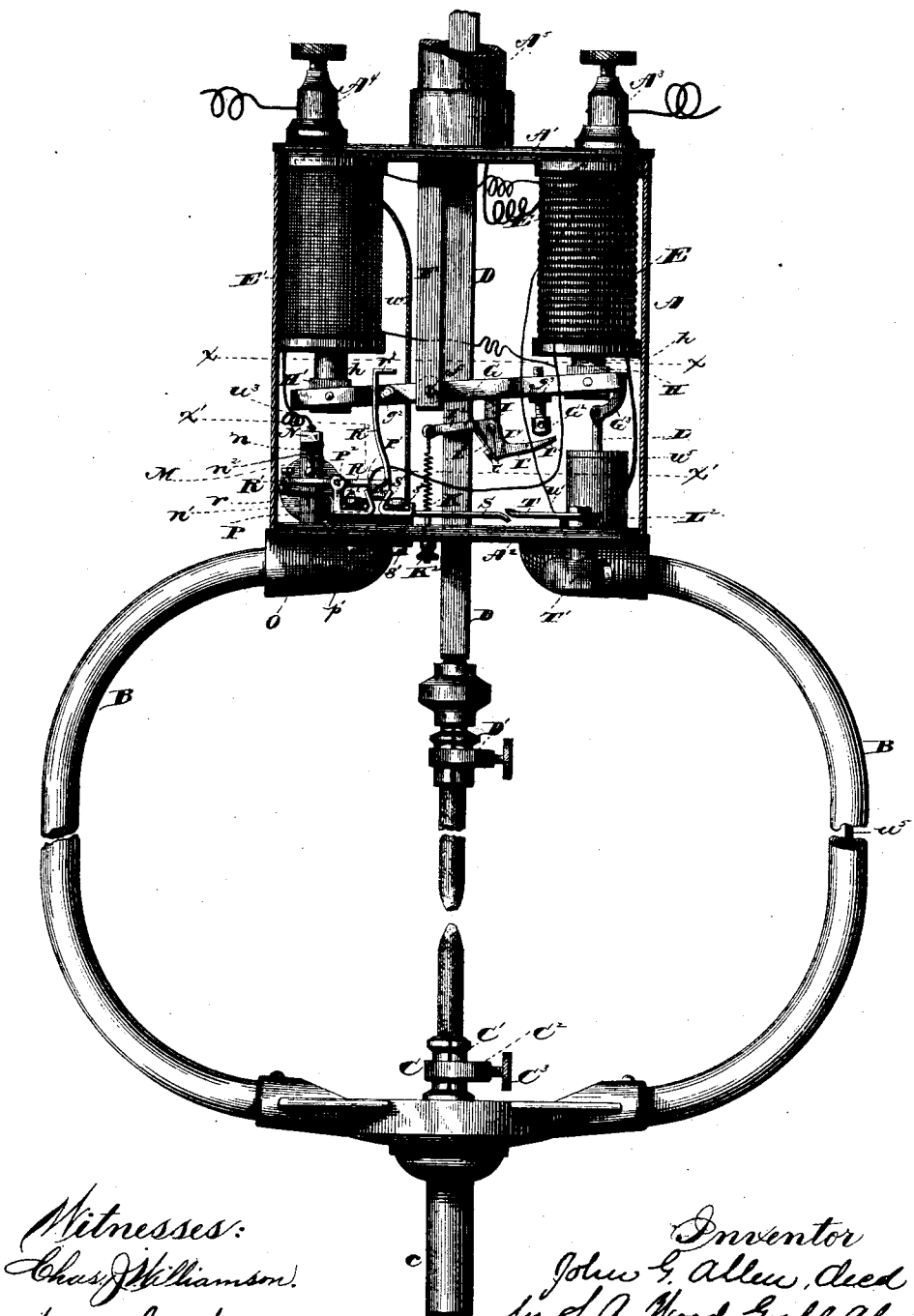

J. G. ALLEN, Dec'd.
S. A. W. GOULD, administratrix.
ELECTRIC ARC LAMP.

No. 327,375. Patented Sept. 29, 1885.

Witnesses:
Chas. J. Williamson
Henry C. Hazard

Inventor:
John G. Allen, dec'd
by S. A. Wood Gould, Admtx.
by Priddle and Russell
Attorneys (No Model.) 4 Sheets—Sheet 4.
J. G. ALLEN, Dec'd.
S. A. W. GOULD, administratrix.
ELECTRIC ARC LAMP.
No. 327,375. Patented Sept. 29, 1885.
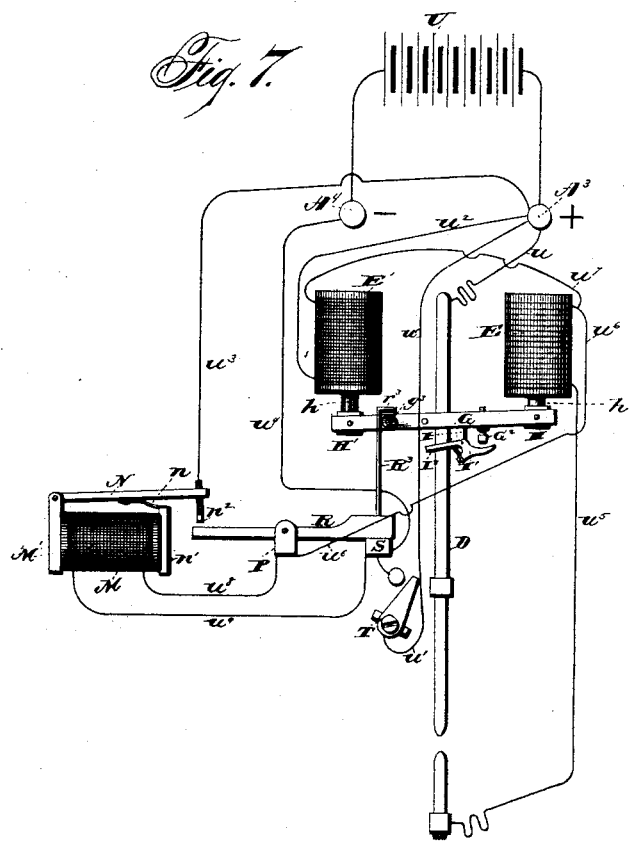
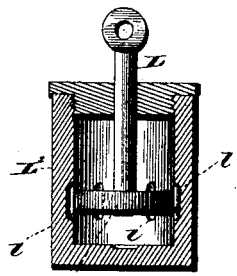
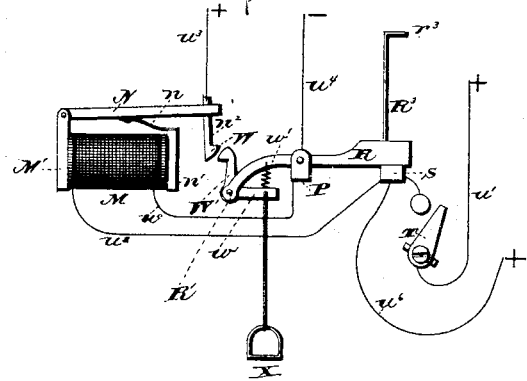
Witnesses:
Chas. J. Williamson
Henry C. Hazard
Inventor:
John G. Allen, dec'd
by S. A. Wood Gould, Admtx.
by Prindle and Russell
Attorneys

United States Patent Office.

JOHN G. ALLEN, OF WORCESTER, MASSACHUSETTS; SYLVIA A. WOOD GOULD ADMINISTRATRIX OF SAID JOHN G. ALLEN, DECEASED.

ELECTRIC-ARC LAMP.

SPECIFICATION forming part of Letters Patent No. 327,375, dated September 29, 1885.

Application filed February 8, 1884. (No model.)

*To all whom it may concern:*

Be it known that I, JOHN G. ALLEN, of Worcester, in the county of Worcester, State of Massachusetts, have invented certain new and useful Improvements in Electric-Arc Lights; and I do hereby declare that the following is a full, clear, and exact description thereof, reference being had to the accompanying drawings, in which—

Figure 5:
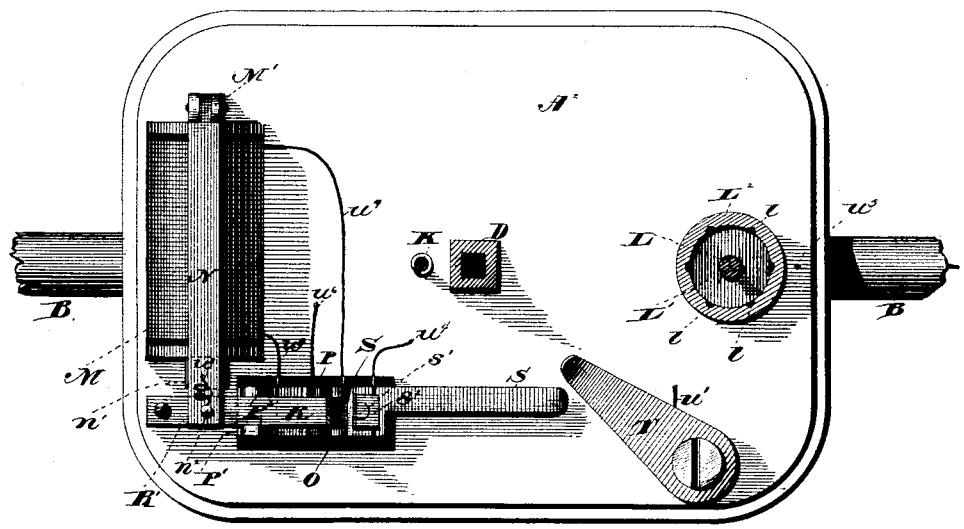
Figure 6:
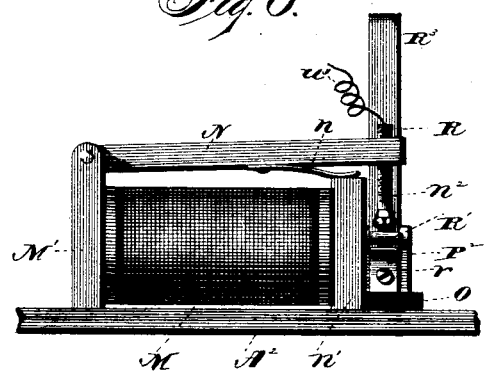

Figure 1 shows a view in front elevation of a lamp made in accordance with my invention, the casing being in section, so as to show the contained mechanism clearly; Fig. 2, a horizontal section of the same on line $x\ x$ of Fig. 1; Fig. 3, an enlarged detail sectional view of the clutch mechanism on line $y\ y$ of Fig. 2; Fig. 4, a detail transverse vertical section on line $z\ z$ of Fig. 3, showing the frictional holding-spring; Fig. 5, a horizontal sectional view of the lamp on line $x'\ x'$ of Fig. 1, the casing being removed; Fig. 6, a detail view in side elevation of the cut-out mechanism; Fig. 7, a detail view showing the arrangement of the circuits, the cut-out mechanism being turned from its regular position, so as to show its circuit-connections most clearly, some of the parts being enlarged in relation to the others; Fig. 8, a detail view showing a modified form of cut-out mechanism, the electro-magnet with its armature-lever being turned with reference to the switch-lever in the same way as in Fig. 7, and Fig. 9 a detail vertical sectional view of the dash-pot.

Letters of like name and kind refer to like parts in each of the figures.

The object of my invention is to provide an improved electric-arc lamp in which there is a more accurate and steady feed of the carbon, insuring a more uniform and steady light and greater regularity of action than has heretofore been obtained, and which is provided with improved means for shunting or switching out the current from the lamp to cut the same out from the circuit, when from any cause, as by the undue increase of the arc or a derangement or breakage of the mechanism, the resistance of the lamp tends to rise above a certain established limit, so as to put out the light without interfering with the action of the other lamps in circuit; and to these ends my invention consists in the construction, arrangement, and combination of parts as hereinafter specified, and more particularly pointed out in the claims.

In the drawings, A designates the casing of lamp-head. Such casing I have shown as rectangular with rounded corners, but do not limit myself to such or any particular shape thereof. It can be made of any suitable material, and in any desired way to hold the mechanism contained therein. From the lower side of this head extend downward the ordinary hollow bow-arms, B B, connected together as usual at their lower ends, and provided at the point of such connection with a suitable holder for the lower carbon.

I do not limit myself herein to any particular form of such holder, though I prefer the clamp form shown at C, consisting of the split hub or short tube C', the sleeve C², surrounding the same, and the set-screw C³, tapped through the sleeve and engaging one side of the split hub.

The lower carbon, as shown, is clasped and held by this holder, and as usual its lower end extends down in and is protected by a tubular downward extension, $c$, of the frame.

Down through the center of the lamp-head extends the upper-carbon carrier-rod D, which I prefer to make, as shown, tubular and square in section. The tubular end of this carrier is provided with a holder or clamp, D', similar to the holder C already described, adapted to receive and hold the upper end of the upper carbon. I do not, however, limit myself to such or any particular form of clamp or holder.

The portion of the carrier extending up through the top A' of the casing of the head is protected, as usual, by hollow extension or projection A⁵ on the top. On this top A' are the two binding-posts A³ A⁴, for the positive and negative wires, or the wires of the incoming and outgoing currents.

Within the casing A, and preferably attached to and supported from the top A', are the two pairs of solenoid form of electro-magnets E E and E' E'. The solenoids E E are low resistance, while the others E' E', situated at the opposite side of the head from solenoids E E, are of the high-resistance kind.

Extending down from the top A' of the head are the two arms F F, in a vertical plane on the side of the carbon-carrier toward the high-resistance coils or solenoids. At or near their lower ends these arms are provided with the bearing-screws $ff$, tapped through the arms, and having their inner ends made conical to engage suitable bearing notches or holes in the front and rear side bars of the tilting frame G, so as to support the same and form pivotal bearings therefor.

Pivoted at their ends in the front and rear side bars of the frame G, at or near its opposite ends, are the bars H and H', below the axes of the low and high-resistance solenoids respectively. From each one of these bars cylindrical arms $h\ h$ extend upward within the centers of the solenoids above, forming cores therefor. With this construction the tilting frame G, which forms a lever for a purpose to be hereinafter described, will be caused to rock in one direction or the other, according as the high or low resistance solenoids attract their respective armatures or movable cores upward with the greater force.

The pivoting of the bars carrying the cores allows of free rocking of the frame, while the cores remain vertical within the solenoids.

The frame G, which is otherwise rectangular, is contracted in width, as seen in plan, at and near the positions of the pivotal bearings thereof.

On the side of the carbon-carrier rod D toward the low-resistance solenoids, a bar, G', extends across the frame parallel to the core-bar H.

From middle of bar G' two ears, $g\ g$, extend inward toward the carrier-rod D. Pivoted to these ears by means of a pin, $g'$, is the upper end of a short link, I, to the lower end of which is pivotally attached the carbon-carrier rod-clutch I'. This clutch consists, as shown, of the portion $I^2$, having the rectangular opening $I^3$, through which the carrier-rod D loosely passes, such opening being larger than the rod in all directions, the part $I^4$ extending downward nearly at a right angle from the part $I^2$, and the outwardly-extending portion $I^5$ at right angles to the lower end of part $I^4$.

At the angle between the portions $I^2$ and $I^4$ a vertical groove or recess is cut, so as to form two ears, between which is pivoted the lower end of the link I by means of a pin, $i$, passing through the ears and link.

Attached to the clutch by means of screw $i'$ is the leaf-spring $I^6$, extending upward so that its upper end comes between the carbon-carrier rod and the outer end of the opening $I^3$ in the portion $I^2$. The extreme upper end of the spring is bent over and outward slightly, so as form a rounded surface at $i^2$ to come in contact with the side of the carrier-rod when the clutch-piece is rocked or tilted to bring the spring into engagement with the rod, as hereinafter described. The outward or rearward movement of the upper end of the spring is limited by coming in contact with the solid portion of the clutch-piece at $i^3$. This stop portion of the clutch-piece is preferably made with a horizontal edge, $i^4$, which engages the spring when the latter is forced back.

The end of the portion $I^2$ which is beyond or on the other side of the carrier-rod, is normally held down, as shown in the drawings, by means of the spiral spring K, attached at its upper end to the clutch-piece, as shown, and at the other to a threaded rod, K', extending down through the bottom $A^2$ of the lamp-head. On this threaded rod, below bottom $A^2$, is a thumb-nut, $K^2$, by which the rod can be drawn down or allowed to rise to regulate the stress of the spring. By this spring a continuous downward pull is exerted upon the end of the clutch-piece, tending to rock the piece, so that the forward end of the opening $I^3$ will bear against the carrier-rod.

Tapped down through a projection on the outer side of frame-bar G' is an adjustable screw-stop, $G^2$, provided with the jam-nut $g^3$, to keep it as set. This stop forms an adjustable tripping device for engaging the portion $I^5$ of the clutch-piece I', as hereinafter to be described.

It will be observed that the link which supports the clutch-piece is connected with the tilting frame or frame-lever G', at a point between the tripping stop $G^2$ and the center or axis of motion of the frame. The trip will then have greater and more rapid motion, as the frame is rocked on its pivots, than will the link and the clutch-piece supported thereby. This arrangement and action is very important in the securing of the proper operation of the clutch, as will be hereinafter set forth.

On the end of the frame, beyond the pivoted bar carrying the cores of the low-resistance solenoids E E, is the rigid arm $G^3$, curved downward and inward toward the center of the head. To the lower end of this arm is pivoted the upper end of the plunger-rod L, carrying on its lower end the piston head or plunger L', fitting and playing in the dash-pot $L^2$, which is preferably, as shown, closed at both its upper and lower ends, so as to act to retard both the upward and downward movements of the end of the pivoted frame G.

The walls of the dash-pot are at $l\ l$ provided with short upright grooves or channels, which for a certain portion of the stroke of the piston L' establish connection between spaces within the pot above and below the piston. As long, then, as this connection is kept up, the air within the pot will obviously offer no resistance to the movement of the piston in either direction. While, then, the piston is free to move without resistance through a portion of its stroke as it moves beyond such portion, so that its upper or lower edges pass beyond the upper or lower ends of the grooves or recesses $l\ l$, the air between the piston and the end of the pot toward which the piston is moving will be confined and compressed, and will act as an air-cushion to prevent too sudden or violent movement of the frame G under the influence of the action of the different pairs of solenoids on their cores.

On the bottom $A^2$ of the head below the high-resistance solenoids E' E' is a low-resistance electro-magnet, M, arranged horizontally, as shown. Pivoted to a standard, M', at the rear end of this magnet is the rear end of the lever N, extending longitudinally over the magnet, so that its forward portion is adapted to be attracted downward, as an armature, by the forward end of the magnet. A small spring, $n$, attached to the armature-lever and engaging the upper end of the part $n'$ of the core of the magnet, tends to keep the lever normally elevated when it is not attracted and drawn down by the magnet or such attraction is only very weak.

The coil of magnet M is insulated, and so is the lever N. Tapped up through the forward end of said armature-lever N is the screw $n^2$, forming an adjustable contact-stud.

Upon an insulating block or plate, O, on the bottom plate, $A^2$, of the lamp-head is the contact-plate P, preferably turned up at one end to form an inclined contact-surface at P', and at the other to form a standard, $P^2$, on which is pivotally supported the switch-lever R, rocking in a plane at right angles to the magnet M, and so situated that its outer arm, R', is in position to be engaged by the screw contact-stud $n^2$ when lever N is drawn down by magnet M, as described. On the other end of lever R, which is made of metal or conducting material, is the contact block or bar $R^2$, adapted to be in contact with and establish connection between the contact-surface P' and a similar surface on the contact-plate S, also on the insulating-plate O, when that end of the lever is down, as shown in the drawings.

A spring, $r$, attached at one end to the arm or standard $P^2$ of the plate P, engages with its other end an adjustable screw-stop on the outer end of lever R. Said spring serves to normally hold that end of the lever raised so as to keep the contact block or bar $R^2$ in position to maintain connection between the two contact-plates P and S.

From the inner end of the lever R, above the contact block or bar R' thereon, is an upwardly-extending arm, $R^3$, whose upper end, standing close beside the front bar of the tilting frame or lever G, is bent over inward to form a hook, $r^3$, adapted to be engaged by the stud or lug $g^2$ on the frame-bar when the lug is raised by the movement of the frame. This lug is, as shown, situated on the frame between the pivot-bearing thereof and the point of pivoting the bar carrying the cores for the high-resistance solenoids, so that when that end of the frame is drawn up by the action of such solenoids upon their core the lug will engage the hook $r^3$, and the contact or inner end of lever R will be raised to raise the block or bar R' out of contact with plates P and S to break the connection between the same. These plates are fastened and held in place on the insulating block or plate O by means of screws $p'$ and $s'$ passing up through the bottom plate, $A^2$, of the head, the block O, and the plates P and S, respectively, and having on their upper ends the nuts $p^2$ and $s^2$. Such nuts serve to properly clamp the ends of the circuit-wires to be connected with the plates P and S down upon them, so as to make good and permanent connection therewith.

The plate S extends from the block so that its outer end is in position to be properly engaged by the contact end of the switch T for extinguishing or relighting the lamp operated by the thumb-piece T' below the bottom plate, $A^2$, of the head. The contacting ends of the plate S and switch T are bent down and up, respectively, so as to get the best form of rubbing contact as the switch is swung over to establish connection between it and the plate.

I contemplate, of course, if desired, providing all the contact-surfaces throughout my light mechanism with platinum facings or studs in the usual and well-known way, and for the well-known reason and purpose.

Instead of the spring for drawing down upon the end of the clutch-piece I', as shown and described, a weight can of course be used, if desired; also, instead of the spring $n$ for normally keeping the switch-lever N raised, the lever could be extended at its rear end beyond its pivotal support, and a weight could be attached to such extension to serve the same purpose as the spring.

Instead of using the spring shown and described for keeping the contact end of the lever R down, such end of the lever can be made heavy for the same purpose.

The circuits made throughout the mechanism of my lamp are as follows: The wires from the source of supply U are connected in the usual way with the binding-posts $A^3$ $A^4$, which, for convenience sake, I term the "positive" and "negative" posts, respectively. From the positive post a wire, $u$, extends to, and is connected with, the metallic carbon-carrier rod D. Another wire, $u'$, connects the same post with the switch T. A third wire, $u^2$, connects the post with one end of the coil-wire of the high-resistance solenoids E' E', and a fourth wire, $u^3$, connects the post with the contact-stud on lever N. The negative post $A^4$ is connected by means of wire $u^4$ with the insulated contact-plate S. One end of the wire of the low-resistance solenoid E is connected by means of wire $u^5$, extending down through one of the tubular arms B, forming the frame of the lamp, with the lower-carbon holder. The other end of the solenoid-wire is connected by means of wire $u^6$ with the contact-plate P, and by means of wire $u^7$ with end of the wire of high-resistance solenoids E E, opposite to that connected by wire $u^2$ with the positive binding-post $A^3$. The contact-plates P and S are connected with the opposite ends of the coil of the low-resistance magnet M by means of wires $u^8$ and $u^9$, respectively.

The operation of my apparatus and mechanism, constructed and arranged as shown and described, is as follows: With the various parts in their normal positions, as described hereinbefore, and the switch T out of contact with the plate S, if a current of electricity from the source of supply be admitted to the lamp over the circuit or supply wires, it will pass over wire $u$ to the carrier-rod D through the carbons, over wire $w^5$ to the low-resistance solenoids E E, thence over wire $w^6$ to plate P, through contact-block R' to plate S, and then by wire $w^4$ to the negative post $A^4$. The current passing through the coils of the low-resistance solenoids E E magnetizes the cores $h$ $h$ and draws them upward in the well-known way, thus raising that end of the tilting lever-frame G'. The air above the piston in the dash-pot described and shown, prevents the too rapid and violent upward swing of the frame under the action of the solenoids upon their cores, and cushions the stroke of the lever end. As the lever or frame is thus swung up, the clutch-piece I', supported therefrom by the link, is also raised. As its forward end is held down by spring K, the clutch-piece will, as it is raised, be tilted at a greater angle with reference to the carbon-carrier rod passing through its opening $I^3$, so that the upper end of spring $I^6$ will be brought against the carrier-rod with greater force, and such rod will, by the cramping action of the clutch, be held between the spring and the opposite end of the opening $I^3$. The rod will thus be held frictionally between the spring and opening end. If the lever and clutch-piece be raised farther, so that the clutch-piece is tilted still farther, the spring $I^6$ will yield until it comes in contact with the portion or projection of the clutch-piece just back of the spring. The carrier-rod is then cramped rigidly by the clutch-piece; but the amount of pressure or force of such clamping is of course regulated by the stress of the spring K, which is adjusted by means of the screw and thumb-nut, as described and shown. After the clutch-piece has been tilted by the movement of the tilting frame to cause the spring $I^6$ to bear against the rod with sufficient force, farther upward movement of the frame and clutch-piece will cause the rod to be lifted so as to raise the upper carbon out of contact with the lower one, so that the desired electrical arc will be formed between them.

Should the distance between the carbons and, consequently, the length of the arc tend to become too great, either because of the consumption of the carbons or because of any inequalities or irregularities in the current by the increased resistance in the circuit, the attraction of the solenoids E E upon their cores will be diminished, as is well known. The end of the tilting frame G', carrying these cores and the clutch, will then descend, lowering the carbon-carrier. As the carbons continue to consume away, the end of the tilting frame has to descend lower and lower to maintain the distance between the carbon ends such that the current can pass over the space to form the arc. As the tripping-stop $G^2$ is, as described, farther from the axis of motion of the frame, it travels faster and farther than the clutch suspended from the frame at a point nearer such axis of motion. Consequently, as the frame swings down, the stop $G^2$ overtakes and engages the rear or outer portion, $I^5$, of the clutch-piece and bears it down, so as to rock the clutch-piece on its pivot and bring the inner or forward cramping portion, $I^2$, of the clutch-piece more nearly at right angles to the carrier-rod D. The cramping action of the clutch-piece upon the rod D is thus diminished until the pressure of the spring $I^6$ upon the carrier-rod is no longer enough to hold the rod frictionally. Said rod will then slide down gradually and gently until the lower end of the upper carbon is brought near enough to the other carbon for the current to travel across between the two properly.

With this construction and operation there is none of the sudden dropping down or falling of the carbon when the arc tends to become too great, which has been the fault in arc lights as heretofore made, and which causes irregularity and jumping of the light. When the carbons have been brought near enough to each other, the low-resistance solenoids E E again act to raise the tilting or lever frame and clutch again. When the frame is down, as described above, and begins to rise again, the pressure of the spring $I^6$ upon the rod is at first quite light, so that there can be no violent jerking up of the carbon, as where a positive clutch or holder is used.

To prevent violent and sudden movements of the clutch-carrying frame I provide the dash-pot already described herein. The piston or plunger of this dash-pot is connected with the frame, so that it is opposite or passing over the grooves or by-passes $l\ l$ in the dash-pot cylinder when the frame is passing through that portion of its movement in which the tripping-stop is acting upon the clutch-piece to diminish its cramping action on the carrier-rod, and cause it to release the latter. The clutch-frame is then free to move quite rapidly as the clutch is being disengaged during the downward movement of the frame, or when the clutch-piece is being swung to clamp the rod again as the frame rises. The movement of the frame at and near each end of its possible motion is cushioned by the air confined between the piston or plunger head and the end of the dash-pot cylinder.

When the lamp is in normal action, the current passes from binding-post $A^3$ through the carrier-rod D, the carbons, wire $w^5$, solenoids E E, wire $w^6$, plate P, block or bar $R^2$, plate S, wire $w^4$, and to binding-post $A^4$, and does not pass through magnet M or the higher-resistance solenoids $E^7\ E'$.

When from any cause or derangement of the lamp mechanism—as by a failure of the feeding mechanism to feed down the carbon properly, so that the arc becomes so lengthened as to increase the resistance above a certain established limit—the current passing through the high-resistance solenoids E′ E′ by way of wire $n^2$, wire $n^7$, wire $n^6$, plate P, bar or block R$^2$, plate S, and wire $n^4$, causes them to attract their cores $h$ $h$ upward to raise that end of the lever or tilting frame with a force preponderating over that of the attractive force of the other solenoids upon their cores. As the frame is thus moved, the lug or friction-roller on the lug on the frame engages the hooked upper end of arm R$^3$, and so raises the contact end of lever R, so that connection between plates P and S is broken. The current is thus directed, so that in passing from plate P to plate S it passes through shunt-magnet M. By the action of this magnet the armature-lever N is drawn down, as described hereinbefore, so that the contact-stud $n^2$ thereon comes in contact with the outer end of lever R. The stud is, as described and shown, connected by wire $u^3$ directly with the] positive binding-post. The current is then directed from binding-post A$^3$ through stud $n^2$, lever R, plate P, wire $n^8$, coil of magnet M, wire $n^9$, plate S, and wire $u^4$ to the negative binding-post A$^4$, being thus shunted or short-circuited from the solenoids E E E′ E′, carbon-carrier and carbons. This shunting or short-circuiting of the current from the lamp is necessary and most desirable, so as to prevent any derangement of the lamp from interfering with or disturbing the action of other lamps in the series, or causing too great resistance in the circuit. So long as the current continues passing through the magnet M, the armature-lever N will be held down, keeping the end of the switch-lever depressed by the engagement of the stud $n^2$, so that the contact-block R$^2$ is kept raised from the plates P and S, and the short-circuiting of the current continues; but if the current should be turned from or cease to flow through the magnet the armature-lever will be thrown up by the spring into its normal elevated position, with its stud $n^2$ out of contact with lever R and the latter lever will be rocked on its pivot by its spring $r$, so as to bring the block R$^2$ down between the contact-surfaces on plate P and S, to establish electrical connection between the plates and complete the normal circuit of the current through the main or low resistance solenoids, as at first, so that the ordinary and normal action of the lamp can be resumed. When, then, the current has been short-circuited from the lamp by the shunt mechanism, as set forth above, and it is desired to throw the lamp into action again, the switch T is turned so as to be in contact with the extension or outer end of plate S, thereby establishing a short circuit from post A$^3$ through wire $u'$, switch T, plate S, and wire $n^4$ to post A$^4$, and short-circuiting the current from magnet M, and then is turned or swung back again out of contact with the plate. This switch is also of use to the attendant while fixing or adjusting the lamp or for extinguishing and relighting the lamp, as desired, while the current is continued from the source of supply without interrupting said current or cutting it off from the other lamps of the circuit. The short circuit which it establishes, when swung as set forth above, is direct from one binding-post to the other, and does not include any of the operative parts of the lamp mechanism.

The tripping-stop G$^2$, by screwing it up or down, can obviously be adjusted to engage and operate the clutch-piece, sooner or later, in the downward movement of the lever-frame.

Where it is not desired to have the shunt or short-circuiting mechanism thrown out of action and into its normal position upon the cutting-off or short-circuiting of the circuit from the shunt-magnet, I contemplate using the modified form of shunting or cut-out mechanism shown in Fig. 8. In this form the armature-lever, which is the same and operated in the same way as that already described, is provided with the contact-lug $n^2$, formed at its lower end with a ratchet-shaped tooth or projection, W, and the lever R is turned downward at R′ and provided with a pivoted latch, W′, adapted at its upper end to engage the projection W on lug $n^2$, and remain in engagement therewith until the latch is swung back by a downward pull upon the hand-pull X, connected with the arm $w$ of the latch. A spring, $w'$, attached to this arm and to the lever, serves to keep the latch swung so as to be normally in position and ready to engage the projection W when the armature-lever is swung down by the magnet. In this modification I connect the wire $u^6$ with the plate S, instead of with plate P, as before, and connect the direct wire $u^4$ from the negative post A$^4$ with the plate P, as in the other construction.

With this construction of parts and arrangement of circuits, when the contact end of lever R is raised by the action of high-resistance solenoids, as in the form of mechanism already described, the current passes from plate S to magnet M, and then to plate P by wire $n^9$, and from there to the negative binding-post. As the current passes through the magnet, the latter attracts the armature downward until the latch W′ catches the projection W. Said latch will then continue to hold the armature-lever down and the current will be short-circuited through wire $n^3$, the projection catch and lever, and then wire $u^4$ to the negative post. All the magnets and coils will then be cut out, and will stay so until the armature-lever N is released by operating the hand-pull to disengage the catch. The lamp, when once thrown out of action by this shunt or short-circuit mechanism, will remain out until visited by the attendant and started again.

This construction may be desirable for certain purposes and under certain circumstances; but I prefer the other construction, of which this is a modification.

I do not intend, of course, to limit myself to a hollow carrier-rod rectangular, in cross-section. Said rod may be solid and of any desired shape in cross-section.

In the drawings I have shown the solenoid form of electro-magnet, and have described the same hereinbefore, but I do not, of course, limit myself to such form, as the other ordinary form of electro-magnet may be used, or one with a hollow core and a cylindrical armature within the same. As these various forms of magnets are the well-known equivalents of and substitutes for one another, I contemplate using any of them, as desired, and for clearness and conciseness in the claims shall refer to the magnets used by the broad term "electro-magnets."

Having thus described my invention, what I claim is—

1. In combination with the carbon-carrier rod, the tilting clutch-piece provided with an opening through which the carrier-rod passes, and a spring attached to the clutch-piece and having its rod-engaging portion situated between the carrier-rod and one end of the opening in the clutch-piece, substantially as and for the purpose described.

2. In combination with the carbon-carrier rod, the cramping-clutch pivotally connected with the clutch supporting and actuating mechanism, and having an opening through which passes the carrier-rod, the spring between one end of the opening and the rod, and the spring for holding the end of the clutch beyond the rod down, substantially as and for the purpose described.

3. In combination with the frame or lever G and the carrier-rod, the cramping-clutch embracing the rod supported from the lever by means of a link, the spring tending to hold down the end of the clutch which embraces the rod, and a stop or lug on the lever beyond the point of connection of the link therewith adapted to engage an arm of the clutch-piece, substantially as and for the purpose described.

4. In combination with the carbon-carrier rod, the tilting frame, the cramping clutch-piece suspended therefrom by a link having an arm extending inward provided with an opening through which passes the carbon-carrier rod, and an arm extending outward, an adjustable trip on the frame beyond the suspending link adapted to engage the outwardly-extending arm of the clutch-piece, and yielding means for holding the cramping portion of the clutch-piece down, substantially as and for the purpose described.

5. In the cramping feed-clutch for the carbon-carrier rod, the spring adapted to engage one side of the rod and hold the rod by friction, and the lug or solid portion of the clutch-piece adapted to limit the yielding or backward movement of the spring, substantially as and for the purpose described.

6. In combination with the pivoted lever-frame and the carbon-carrier rod, the link dependent from the frame at a point on the opposite side of the carrier-rod from the frame-pivot, the cramping clutch-piece having the inwardly-extending arm embracing the rod and the outwardly-extending arm, the stop or trip on the frame beyond the link, and devices, substantially as described, adapted to raise the frame-arm carrying the clutch as the carbon in the carrier tends to approach the lower carbon too nearly, substantially as and for the purpose described.

7. In an automatic cut-out for electric lights, in combination with the magnet M, located in the main circuit, the pivoted contact-lever and suitable connections whereby said lever normally short-circuits the magnet, a high-resistance magnet, a device controlled by the armature of such magnet to move the lever and break the short circuit of the magnet M when the resistance of the arc exceeds a certain point, the armature-lever for the magnet M, and suitable devices and connections whereby, when the armature-lever is attracted by magnet M, the carbons will be short-circuited, substantially as and for the purpose described.

8. In an electric-light apparatus, in combination with the feed-clutch-carrying pivoted frame or lever, having its opposite arms provided with suitable armatures, the low-resistance magnet placed in circuit with the carbons adapted to act upon the armature on that arm of the lever which carries the clutch, the high-resistance magnet adapted to act upon the other armature, suitable connections, so that when the resistance of the arc increases above a certain point the current passes through the coil of the high-resistance magnet, and a cut-out device for short-circuiting both magnets, and the carbons adapted to be set in action as the arm of the lever is raised by the high-resistance magnet, substantially as and for the purpose described.

9. In combination with magnet M, the armature-lever N, the contact-stud thereon, and the spring tending to keep the lever N from the magnet, the conducting-lever R, in electrical connection with plate P, and provided with means for normally establishing connection between plates P and S, connected with opposite ends of the coil of the magnet, a connection between the stud and one wire of the supply-circuit and the plate S and the other wire of such circuit, the clutch-lever, and the high and low resistance magnets actuating opposite ends of the lever, and means, substantially as described, whereby as the high-resistance magnet raises its end of the clutch-lever the lever R is moved to break the connection between plates P and S, substantially as and for the purpose described.

10. In a cut-out apparatus for electric-arc lights, the combination of the cut-out magnet located in the main circuit, a movable short-circuiting conductor for normally diverting the current from said magnet, means for breaking said short circuit, a magnetic device for automatically actuating the means for breaking the short circuit when the resistance in the arc reaches a certain point, the conductor for short-circuiting the carbons having a movable point controlled by the armature of the cut-out magnet, and means for retaining the cut-out or short-circuiting devices from returning to their normal position while the current continues to flow through the cut-out magnet, substantially as and for the purpose described.

11. In combination with the contact-plates P and S, located in the main circuit, the cut-out magnet, the armature-lever, the contact-stud thereon electrically connected with one of the main-binding-posts, the conducting switch-lever adapted to make contact between the plates P and S, the arm on the lever, the tilting frame G, the lug thereon adapted to engage a portion of the arm on the lever, substantially as and for the purpose described.

12. In combination with the dash-pot cylinder closed at both ends and provided with the grooves or by-passes on its inner face, the piston fitting and moving within such cylinder, substantially as and for the purpose described.

13. In an electric-light mechanism, in combination with the clutch mechanism and the magnets for operating the same, the plunger or piston, and the inclosing-cylinder, closed at both ends and having grooves or by-passes on its inner face adapted to establish connection between the spaces above and below the piston or plunger head during a certain portion of its stroke, substantially as and for the purpose described.

Witness my hand this 1st day of February, A. D. 1884.

JOHN G. ALLEN.

Witnesses:
CHAS. H. BURLEIGH,
S. R. BARTON.